Figure 1A:
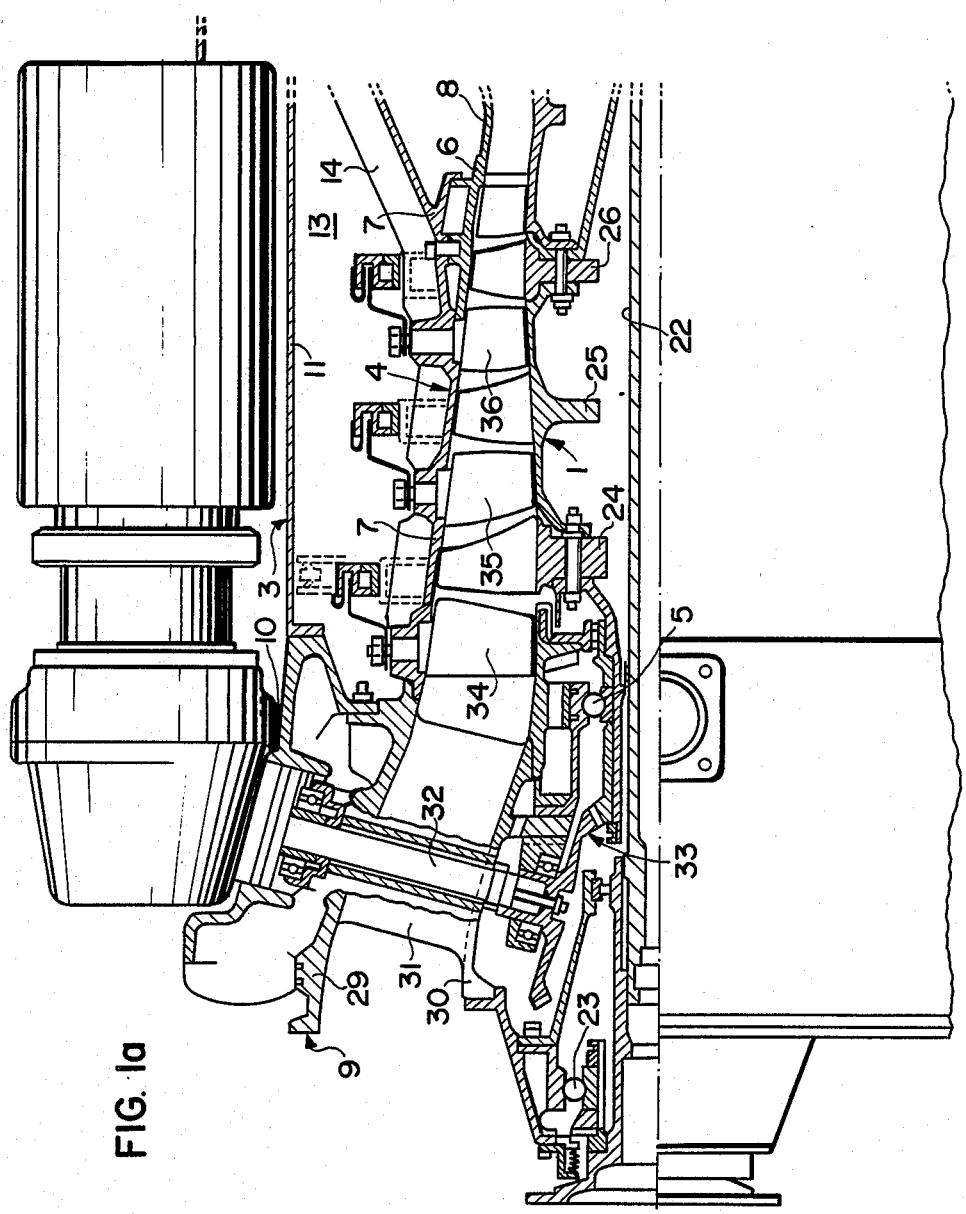

United States Patent [19]

Weiler

[11] Patent Number: 4,578,942

[45] Date of Patent: Apr. 1, 1986

[54] GAS TURBINE ENGINE HAVING A MINIMAL BLADE TIP CLEARANCE

[75] Inventor: Wolfgang Weiler, Dachau, Fed. Rep. of Germany

[73] Assignee: MTU Motoren-und Turbinen-Union Muenchen GmbH, Munich, Fed. Rep. of Germany

[21] Appl. No.: 600,762

[22] Filed: Apr. 16, 1984

[30] Foreign Application Priority Data

May 2, 1983 [DE] Fed. Rep. of Germany ....... 3315914

[51] Int. Cl.$^4$ .......................... F02C 7/28; F02C 7/06; F01D 11/08
[52] U.S. Cl. ................................. 60/39.32; 415/134; 415/170 R
[58] Field of Search .......................... 60/39.32, 39.31; 415/219 R, 134, 135, 170 R

[56] References Cited

U.S. PATENT DOCUMENTS

| | | | |
|---|---|---|---|
| 3,304,054 | 2/1967 | Oechsun et al. | 415/134 |
| 3,709,637 | 1/1973 | Petrie et al. | 60/39.32 X |
| 4,101,242 | 7/1978 | Coplin et al. | 415/134 |
| 4,439,981 | 4/1984 | Weiler et al. | 60/39.32 |

FOREIGN PATENT DOCUMENTS 2165528  7/1973  Fed. Rep. of Germany.

Primary Examiner—Carlton R. Croyle
Assistant Examiner—Jeffrey A. Simenauer
Attorney, Agent, or Firm—W. G. Fasse; D. H. Kane, Jr.

[57] ABSTRACT

A gas turbine engine is so constructed that the clearance or gap between the rotor and stator, especially at the outer diameter range of a radial flow end stage, is optimally maintained under all operating conditions. For this purpose the housing in the axial-flow/radial-flow compressor is constructed as a two shell housing. The outer housing shell is mounted as part of the engine structure, whereby the inner housing shell is exposed substantially only to forces or loads caused by compressor fluid flow. The material of the outer housing shell has a heat expansion coefficient in the axial direction of the rotational engine axis, which is distinctly lower than the heat expansion coefficient of the material of the compressor rotor. The heat expansion coefficient of the material of the inner housing shell is lower in the circumferential direction and approximately equal in the axial direction relative to the heat expansion coefficient of the rotor. The fixed bearing of the compressor rotor is arranged in the zone of the compressor inlet.

14 Claims, 1 Drawing Figure

GAS TURBINE ENGINE HAVING A MINIMAL BLADE TIP CLEARANCE

FIELD OF THE INVENTION

This invention relates to a gas turbine engine or prime mover constructed to have a minimal play between the rotor blade tips and the inner stator surface. More specifically, variations of said play shall be minimized generally and especially in the outer diameter area of the radial flow final stage of a combined axial-flow/radial-flow compressor forming part of a single shaft rotor system of a gas generator. Such a system comprises a compressor housing essentially extending over the entire length of the axial-flow/radial-flow compressor and the housing has an outer and an inner housing shell.

BACKGROUND OF THE INVENTION

The above mentioned play also includes the axial gap or clearance in the outer diameter area of the radial-flow final stage of a combined axial-flow/radial-flow compressor. The size of said axial gap or clearance in the outer diameter area has a considerable influence on the efficiency and the operational response of the compressor and, thus, of the entire engine. For an engine in the 1000-kw power category, e.g., the compressor efficiency will drop about 1% if said clearance is increased by 0.1 mm to 0.3 mm. The drop in efficiency in turn increases the specific fuel consumption by about 1.6% at a more than 2% drop in power per unit flow.

In conventional engine constructions featuring a single-shell compressor casing or housing and a fixed bearing arranged in the compressor intake, comparatively large changes in said tip clearance or gap will necessarily result between assembly, engine idle and full load conditions because the thermal expansion proportion of the compressor housing is larger than those of other components and hence that proportion is dominant.

Arrangement of the fixed or locating bearing of the gas generator behind the radial-flow compressor and ahead of the high-pressure or compressor drive turbine would achieve a comparatively acceptable maintenance of the gap width. However, such an arrangement requires a compromise in the maintenance and scavenging conduits for the locating bearing because the supply conduits or lines must pass through the main flow, especially in the area of the diffuser system. As a result again considerable disadvantages affecting the compressor efficiency must be tolerated because of wake turbulences caused by the relatively thick walls of the diffuser vanes required for accommodating the supply lines. Accordingly, the increased heat generation or heat exposure of a gas generator locating ball bearing necessitates the supply and scavenging of greater amounts of lubricant compared to that of a floating bearing. Therefore, the above mentioned supply lines must have sufficiently large cross-sectional flow areas which interfere with or reduce the main flow cross-sectional area to an undesirably high degree, thereby causing said comparatively pronounced wake turbulences. Hence, the arrangement of the locating bearing as described above causes considerable trouble in connection with an optimal heat dissipation from the fixed bearing when it is located in the engine environment mentioned above.

Additionally, relatively substantial difficulties are still being encountered, especially with a view to the compressor casing and/or rotor materials to be used, in the attempt to safely achieve an optimal clearance or gap in the face of the problems outlined above, especially with regard to severe load fluctuations or frequently occurring transient operating conditions.

OBJECTS OF THE INVENTION

In view of the above it is the aim of the invention to achieve the following objects, singly or in combination:

to avoid the disadvantages described above, particularly the disadvantages encountered in arranging a locating bearing behind the radial-flow final stage of the radial-flow compressor are to be eliminated;

a minimized, maximally constant blade tip clearance or gap, especially for a radial-flow compressor of the combined axial-flow/radial-flow compressor is to be achieved over a comparatively wide operating range including constant or stationary and transient operating conditions; and to positively influence or change the factors which heretofore caused variations in said gap.

SUMMARY OF THE INVENTION

According to the invention there is provided a gas turbine engine having a compressor housing with an outer shell constructed of a material having a second axially and circumferentially effective thermal expansion coefficient in the axial direction of the longitudinal central engine axis, which is markedly lower than a first axially and circumferentially effective thermal expansion coefficient of the compressor rotor material, and an inner shell constructed of a material having a thermal expansion coefficient which is lower than that of the of the compressor rotor material in the circumferential direction, but approximately equal to that of the compressor rotor material in the axial direction, and wherein said inner shell protects said outer shell of the compressor housing forming part of the entire structure, against influences by the compressor flow over its full overall length including the axial-flow and radial-flow sections of the compressor, said outer shell being connected in one plane only to the inner shell which is exposed essentially only to deformation forces caused by the compressor flow, whereby any play between the rotor blade tips and the inner stator surface is substantially prevented.

The two-shell construction of the compressor housing in accordance with the present invention in combination with the arrangement of the locating or fixed bearing in the engine intake zone or intake casing eliminates in further combination with the compressor housing shell materials and criteria, the above disadvantages of the prior art and minimizes any changes in the blade tip clearance or gap that might occur throughout the entire operating range from idle to full load conditions.

The invention is based on the recognition that the clearance between rotor and housing is essentially governed by the relative, thermal and stress-induced expansions of rotor and housing alike. These respective expansions vary in direction and size or value in response to the engine load stage. Another consideration to be taken into account is the fact that the various relative expansions vary at different rates when the engine is subject to transient operating conditions. The relative stress-induced expansions including, e.g., expansions caused by centrifugal force, transverse rotor shrinkage and deformation of the housing under compressive loads will follow spontaneously any speed changes.

These expansions due to r.p.m. changes are referred to as load expansions. Thermal expansions on the other hand will invariably lag behind by some constant length of time. The respective time constants of such thermal expansions may be as long as three minutes in engines of the large power category mentioned above, e.g. 1000 kw.

Inasmuch as all components of an engine are subject to three-dimensional stress conditions which result from stress-induced expansions caused by the rotor rotation and from thermal expansions, the relative radial and axial total expansions follow different laws.

The foregoing shall be exemplified with reference to the displacement of the final radial-flow stage of a compressor of an engine in the 1000 KW category. Such compressor has three axial-flow stages and one final radial flow stage. The axial displacement or expansion is caused by the thermal expansion of the axial-flow section of the compressor and by the transverse contraction of the radial flow section of the compressor. The sum of these displacements results in a reduction in the length of the axial-flow section of the compressor. The thermal expansion and the transverse contraction of the final radial flow stage are approximately zero when added together. Thus, the axial displacement of the entire rotor is essentially caused by the displacements of the axial-flow rotor stages.

In this example, the radial displacement is caused solely by the stress induced expansions and by the thermal expansions of the final radial flow stage. These two expansions or displacements are always positive.

Corresponding considerations apply to the displacements of the housing or casing.

Inasmuch as the sum of rotor and casing displacements ultimately determine the respective clearances or gaps, the variations in axial and radial gaps follow different laws.

The above considerations illustrate the importance of the relationship or cooperation between the two-shell construction and the material selection for the two shells for achieving the resultant optimization of the clearance or gap.

More specifically, the two-shell casing or housing construction affords, in addition to its favorable effect on the compressor gap or clearance, the following advantages. A smooth engine periphery is one advantage. The outer casing shell serves for all structural functions in the forward engine area, whereby the geometrically complex, directly flow-wetted inner shell is exposed to lower load conditions and thus may be constructed economically, e.g., as a light metal casting or conceivably as a molding made of directionally or randomly oriented short carbon fiber molding compounds. The conduits or lines and the actuating and control elements in the compressor area are protected, e.g. from gun fire in military applications. An additional protection is provided against housing penetration or housing bursting in the event of blade or rotor damages. Differences in axial expansions between the rotor and housing in the turbine area have been markedly reduced, whereby, for example, abradable self-seating labyrinth seals may be used which have a relatively high effective sealing action. Such improved sealing action also contributes to the good efficiencies also with regard to the high pressure compressor turbine of the gas generator.

BRIEF FIGURE DESCRIPTION

In order that the invention may be clearly understood, it will now be described, by way of example, with reference to the accompanying drawing, wherein the single FIGURE of the accompanying drawing illustrates an embodiment of the gas turbine engine of the present invention, showing the upper half of the engine as an elevational view without the outer casing structure, while the lower half of the drawing shows the outer engine housing, however, broken away at its lower portion.

DETAILED DESCRIPTION OF PREFERRED EXAMPLE EMBODIMENTS AND OF THE BEST MODE OF THE INVENTION

The gas turbine engine illustrated on the drawing comprises a single shaft gas generator having a respective single shaft, axial-flow compressor 1 combined with a radial-flow compressor 2. Such an engine is constructed for preventing changes in blade tip clearance or gap between rotor and stator, especially in the outer diameter area of the radial-flow final stage of the combined compressor. The compressor 1, 2 has a two-shell compressor housing extending over the entire length of the compressor, whereby the outer shell 3 of the housing forms part of the engine structure so that the inner shell 4 of the compressor housing is essentially not exposed to any loads other than the forces of the compressor flow. The locating or fixed bearing 5 of the gas generator is advantageously arranged in the compressor intake area or zone.

The outer shell 3 is preferably constructed of a material having a thermal expansion coefficient in the direction of the longitudinal rotational axis of the engine, clearly or measurably lower than that of the compressor rotor material. It is important in this connection that the outer shell 3 shall not be exposed to or wetted by compressor air or bleed air from the compressor. The inner shell 4 is constructed of a material having a thermal expansion coefficient in the circumferential direction lower than that of the compressor rotor material, however about equal to that of the compressor rotor material in the longitudinal axial direction.

In a further aspect of the present invention the outer shell 3 and/or the inner shell 4 is manufactured of fiber compound materials, preferably carbon fiber reinforced resins.

Preferably the outer shell 3 is made as a composite or compound structure for achieving two functions or purposes. A metallic or fiber-reinforced material is used to serve for the structural functions and a composite fiber compound material of extremely impact resistant fibers, such as Kevlar (Registered Trademark of E. I. du Pont de Nemours & Co.) is used to serve for the protective function. Such construction provides protection against bursting and/or protection of the compressor against externally inflicted damage, e.g., gun fire. Said Kevlar fibers are organic fibers of aromatic or aromatized polyamide.

The outer shell 3 is made wholly or partially of a fiber compound material based on carbon fibers embedded in an epoxide or polyimide resin matrix. A comparatively high content of the carbon fibers is oriented in the longitudinal direction of the housing. The thermal expansion coefficient of said fiber compound material in the direction of the longitudinal engine axis is selected to be within the range of 2 to $8 \times 10^{-6}$ °C.$^{-1}$, but preferably at $4.5 \times 10^{-6}$ °C.$^{-1}$ where a titanium compressor rotor is used.

The inner shell 4 is wholly or partially constructed as a molding made of a molding or casting compound of directionally or randomly oriented short carbon fibers. Further, the inner shell 4 may optionally be subdivided into at least two partial shell sections 7, 8 to form compressor air bleed ports or coaxial bleed slots 6. The partial shell sections 7, 8 are constructed differently one from the other with due regard to the respective local operating conditions.

As shown, the radial-flow section 2 of the compressor is a single stage compressor and the axial-flow section 1 is a three stage compressor. However, the invention is not limited to a three stage axial flow section. Any suitable number of stages may be used in the axial flow section 1.

The compressor intake casing 9 is a double-walled supporting structure to which the locating or fixed bearing 5 of the gas generator is mounted. A front portion 10 of the outer shell 3 is also fixed in its position by the intake casing 9. The outer shell 3 also comprises a rear portion 11 fixed in position between the front shell portion 10 on at one end and the radial-flow diffuser 12 at the other end.

The partial shell section 8 of the inner shell 4 serves as a radial-flow compressor cover plate. The shell section 8 is separated from the inner structure of the axial compressor section 1 by said coaxial air bleed slots 6. The shell section 8 is attached to a stiffening component 14 of the structure 7 of the inner shell 4. The stiffening component 14 is located in the ring space 13 between the outer shell 3 and the inner shell 4 and reaches into the vicinity of the centrifugal flow diffuser 12.

In addition to the arrangement of the locating or fixed bearing 5, which is a ball bearing, at the intake end of the compressor a second, floating bearing 15 is arranged between the radial-flow compressor 2 and the high pressure turbine 16.

The centrifugal flow diffuser 12 comprises a bent elbow duct section 17 for deflecting the compressor air flow substantially by 90°. An axial-flow guide baffle 19 for further decelerating the flow is arranged downstream of the elbow 17. The combustion chamber 18 is charged through the guide baffle 19 with the necessary primary combustion air and the requisite cooling, secondary and tertiary air flows. One or more guide vanes of said axial-flow guide baffle 19 may internally accommodate supply and scavenging lines or ducts 20 for the floating bearing 15. As shown, the high pressure turbine 16 driving the compressor 12 of the gas generator also drives a two-stage, axial-flow power turbine 21 having a shaft 22 passing through the tubular hollow shaft of the gas generator toward the forward end of the engine, where a fixed or locating bearing 23 supports the shaft 22 of the power turbine 21.

The common rotor system of the gas generator comprises, among others, the respective rotor disks 24, 25 and 26 of the axial-flow section 1 of the compressor and the rotor disk 27 of the radial-flow compressor section 2, as well as the rotor disk 28 of the high-pressure turbine 16. These disks are coupled one to the other by transverse disk webs or drum members to form a common gas generator rotor system.

The compressor intake casing 9 comprises an outer duct section 29 and an inner duct section 30 connected to each other by hollow vanes 31 functioning as support struts. An accessory drive shaft 32, which is positively connected to the gas generator shaft through a gear 33 arranged at the engine front end, passes through one of said support struts 31.

As shown, the stator guide vanes 34, 35, 36 of the various compressor stages of the multistage axial-flow section 1 of the compressor are adjustable in their position. For this purpose each stator guide vane has a threaded stud extending through the structure 7 of the inner housing shell 4. The studs are held by nuts and are also connected to respective adjustment members. The heat expansion coefficients selected as taught by the invention for the various compressor components are within the following ranges:

The first axially and circumferentially heat expansion coefficient relates to the material of which the rotor components are made and is within the range of 8:8 to $9.2 \times 10^{-6}$° C.$^{-1}$.

The second axially effective heat expansion coefficient relates to the material of which the outer housing shell 3 is made and is within the range of 2 to $8 \times 10^{-6}$° C.$^{-1}$.

The material of the inner housing shell 4 is made to have two heat expansion coefficients. Thus, the third heat expansion coefficient is effective in the axial direction of the inner housing shell 4 and is in the range of 8.8 to $9.2 \times 10^{-6}$° C.$^{-1}$, and the fourth heat expansion coefficient is effective in the circumferential direction of the inner housing shell 4 and is in the range of 6 to $8 \times 10^{-6}$° C.$^{-1}$.

For example, the coefficient of thermal expansion of carbon fiber is negative longitudinal to the fiber and positive transverse to the fiber. The coefficient of the thermal expansion of the matrix is always positive. The coefficient of thermal expansion of the combination can be controlled by appropriate arrangement of the fiber matrix system and layer arrangement.

Although the invention has been described with reference to specific example embodiments, it will be appreciated, that it is intended, to cover all modifications and equivalents within the scope of the appended claims.

What is claimed is:

1. A gas turbine engine having a longitudinal axis and an intake zone, comprising compressor means having an axial flow compressor section and a radial flow compressor section including respective rotor means made of a material having a first axially and circumferentially effective heat expansion coefficient, and respective stator means, fixed bearing means in said intake zone for mounting said rotor means in said stator means with an optimal clearance in the outer diameter area between said rotor means and said stator means for optimal efficiency, said engine further comprising compressor housing means including outer housing shell means (3) made of a material having a second axially effective heat expansion coefficient which in the direction of said longitudinal axis is measurably, distinctly lower than said first heat expansion coefficient, inner housing shell means (4) made of a material having a third axially effective heat expansion coefficient which, in the direction of said longitudinal axis is approximately equal to said first heat expansion coefficient, said material of said inner housing shell (4) having a fourth circumferentially effective heat expansion coefficient which in a circumferential direction, is lower than said first heat expansion coefficient, and means mounting said outer housing shell means in such a position in said engine structure that said outer housing shell means is connected to said inner housing shell means substantially in one plane only and thus becomes part of the engine structure so that said inner housing shell means is exposed substantially only to deforming forces caused by fluid flow through said compressor means for protecting said outer housing shell means against forces caused by compressor fluid flow, whereby during operation any variations in said optimal clearance are substantially eliminated.

2. The gas turbine engine of claim 1, wherein said outer shell (3) comprises a compound construction of a first material selected for structural functions and of a second material selected for protective functions, said second material comprising extremely impact-resistant fibers, such as Kevlar (RTM).

3. The gas turbine engine of claim 1, wherein the outer shell (3) is made entirely or partially of a compound fiber material including carbon fibers embedded in an epoxide or polyimide resin matrix, wherein a comparatively high carbon fiber content is oriented in the longitudinal direction of the outer shell (3) and said second thermal expansion coefficient of this compound material in the direction of said longitudinal axis is within the range of 2 to 8 times $10^{-6}$° C.$^{-1}$.

4. The gas turbine engine of claim 3, wherein said rotor means are made of titanium, and wherein said second thermal expansion coefficient is 4.5 times $10^{-6}$° C.$^{-1}$.

5. The gas turbine engine of claim 1, wherein said outer shell (3) and/or said inner shell (4) is made of compound fiber materials, preferably of carbon fiber reinforced resins.

6. The gas turbine engine of claim 1, wherein said inner shell (4) is constructed completely or partially as a molding made of a molding compound of directionally or randomly oriented short carbon fibers in a binder matrix.

7. The gas turbine engine of claim 1, wherein said inner shell (4) is subdivided into at least two partial shell sections (7, 8) for forming compressor air bleed means, said partial shell sections having different structures in accordance with individual operating conditions.

8. The gas turbine engine of claim 1, wherein said radial compressor section constitutes the final stage of the compressor means, said axial compressor section upstream of said radial compressor section comprising several axial flow stages.

9. The gas turbine engine of claim 1, comprising a stationary, double-walled compressor intake casing (9) located in said intake zone as a load bearing structural component for supporting said fixed bearing (5) of said compressor rotor means, and for supporting said outer shell means (3) at its forward end.

10. The gas turbine engine of claim 1, wherein said outer shell means (3) comprise a forward shell member (10) and a rearward shell member (11) located between the forward shell member (10) and a radial-flow diffuser (12).

11. The gas turbine engine of claim 1, wherein said inner shell means (4) comprise a shell portion (8) arranged as a radial flow section cover disk, said disk (8) being separated by a coaxially extending bleed air slot (6) from said inner shell means (4, 7) forming part of said axial-compressor section (1), said engine further comprising a stiffening component (14), and a radial flow diffuser (12) arranged downstream of said radial compressor section (2), said inner and outer shell means enclosing an annular space (13) in which said stiffening component (14) is located, said stiffening component (14) being connected at one end thereof to said inner shell means (4), said disk (8) being attached to the opposite end of said stiffening component (14) near said radial flow diffuser (12) which is also secured to said stiffening component (14) at said other end thereof.

12. The gas turbine engine of claim 1, further comprising a high-pressure turbine (16) and floating bearing means (15) arranged behind said radial compressor section (2) and ahead of said high-pressure turbine (16).

13. The gas turbine engine of claim 1, further comprising an annular reverse flow combustion chamber (18) and a radial flow diffuser (12), elbow means (17) connected to said diffuser (12) for deflecting compressor air flow substantially by 90° into an axial direction, axial-flow stator guide baffle means for further decelerating compressor air flow before its entry into said annular reverse flow combustion chamber (18), said guide baffle means having one or several guide vanes for internally accommodating lines (20) for supplying a floating bearing with a fluid.

14. The gas turbine engine of claim 1, wherein said outer housing shell means (3) and said inner housing shell means (4) extend over the entire length of said axial and radial flow compressor sections.

* * * * *

UNITED STATES PATENT AND TRADEMARK OFFICE
CERTIFICATE OF CORRECTION

PATENT NO. : 4,578,942

DATED : April 1, 1986

INVENTOR(S) : Wolfgang Weiler

It is certified that error appears in the above-identified patent and that said Letters Patent is hereby corrected as shown below:

On the title page "1 Drawing Figure" should read -- 2 Drawing Figures --.

Figure 1B:
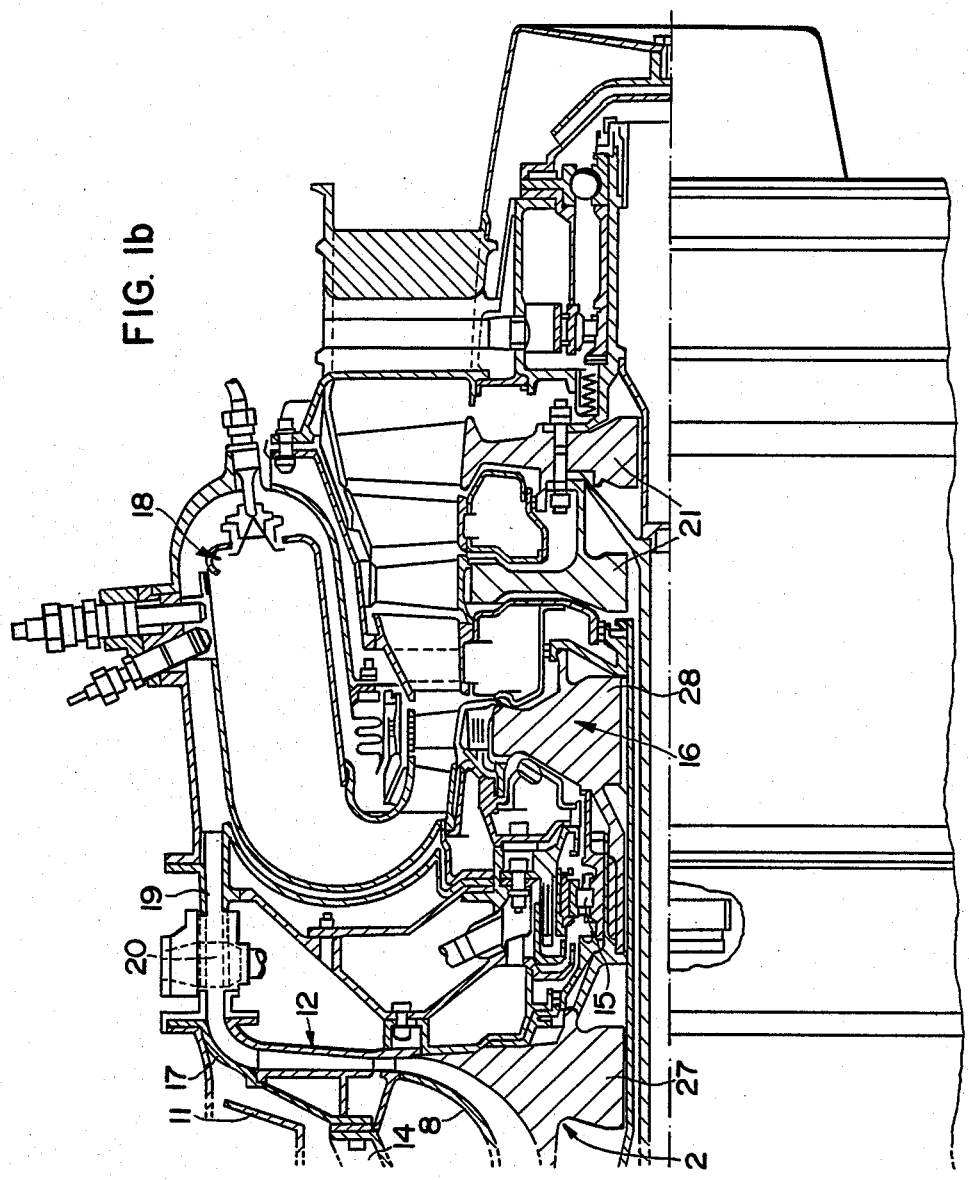

Column 4, line 6, "the single FIGURE of" should read: --Figs. 1a and 1b together form--;
line 7, replace "trates" by --trating--.

Signed and Sealed this

First Day of July 1986

[SEAL]

Attest:

Attesting Officer

DONALD J. QUIGG

Commissioner of Patents and Trademarks